(12) United States Patent
Xu et al.

(10) Patent No.: US 12,719,366 B2
(45) Date of Patent: Aug. 25, 2026

(54) SWITCH CONTROL CIRCUIT AND METHOD, POWER CONVERSION SYSTEM

(71) Applicant: Halo Microelectronics Co., Ltd, Foshan City (CN)

(72) Inventors: Yang Xu, Foshan City (CN); Wenchao Qu, Foshan City (CN)

(73) Assignee: Halo Microelectronics Co., Ltd., Foshan City (CN)

( * ) Notice: Subject to any disclaimer, the term of this patent is extended or adjusted under 35 U.S.C. 154(b) by 164 days.

(21) Appl. No.: 18/527,199

(22) Filed: Dec. 1, 2023

(65) Prior Publication Data

US 2025/0105737 A1 Mar. 27, 2025

(51) Int. Cl.
*H02M 3/158* (2006.01)
*H02M 3/157* (2006.01)

(52) U.S. Cl.
CPC .......... *H02M 3/158* (2013.01); *H02M 3/157* (2013.01)

(58) Field of Classification Search
CPC .......... H02M 3/158; H02M 3/157156; H02M 3/1563; H02M 3/1566; H02M 3/1582; H02M 3/1584; H02M 3/1586
See application file for complete search history.

(56) References Cited

U.S. PATENT DOCUMENTS

2016/0308441 A1* 10/2016 Chen .................. H02M 3/1588

* cited by examiner

*Primary Examiner* — Nguyen Tran
(74) *Attorney, Agent, or Firm* — AP3 Law Firm PLLC

(57) ABSTRACT

A switch control circuit comprises a comparison branch and a feedback branch. The comparison branch controls the turning off of the second power switch in the power conversion circuit based on the polarity of the voltage difference between the common node and the first voltage. The feedback branch generates a feedback signal based on the polarity of the first signal after the second power switch is turned off and a delay of the first duration and adjusts the first voltage. The first signal can be a voltage difference or the voltage of the common node. If the polarity of the first signal is positive, the first voltage is reduced to make the comparison branch turn off the second power switch earlier. If the polarity of the first signal is negative, the first voltage is increased to make the comparison branch delay the turning off of the second power switch.

19 Claims, 13 Drawing Sheets

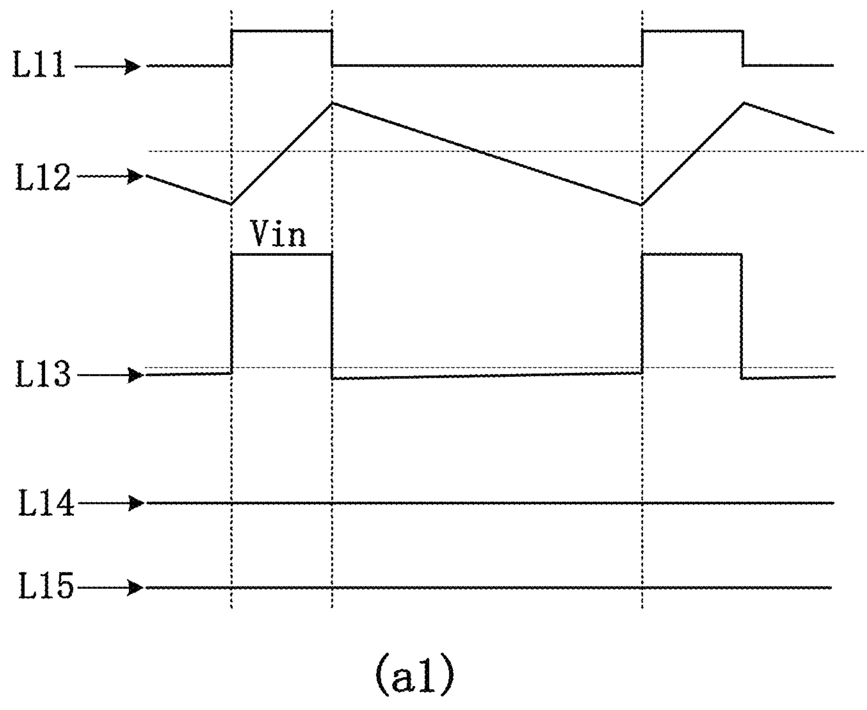
(a1)
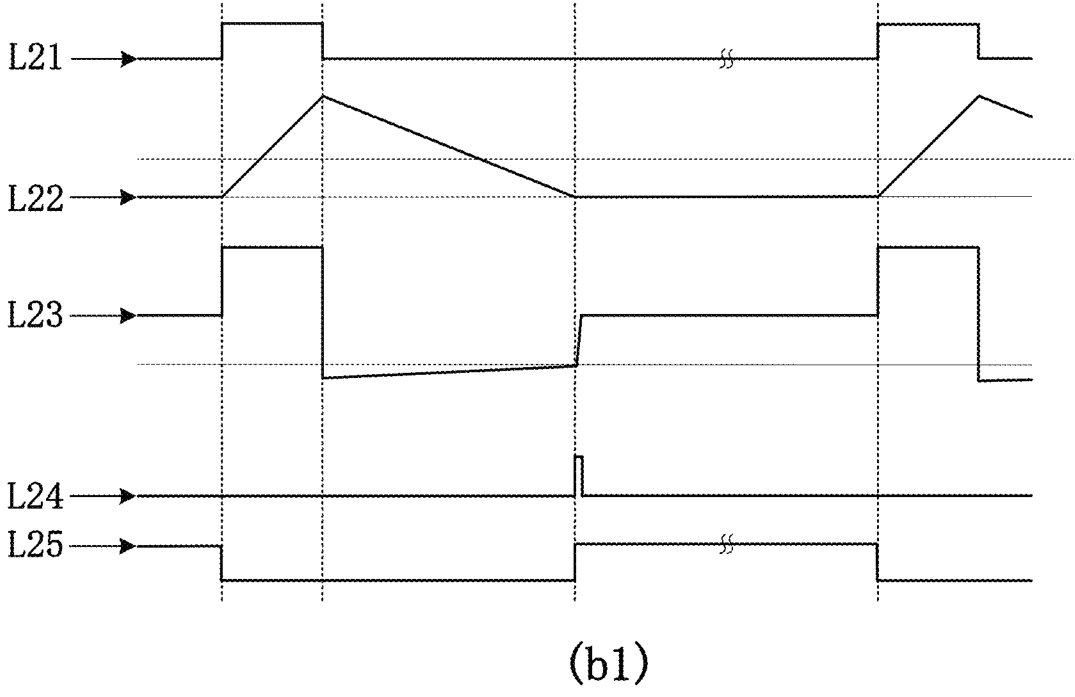
(b1)
Figure 2

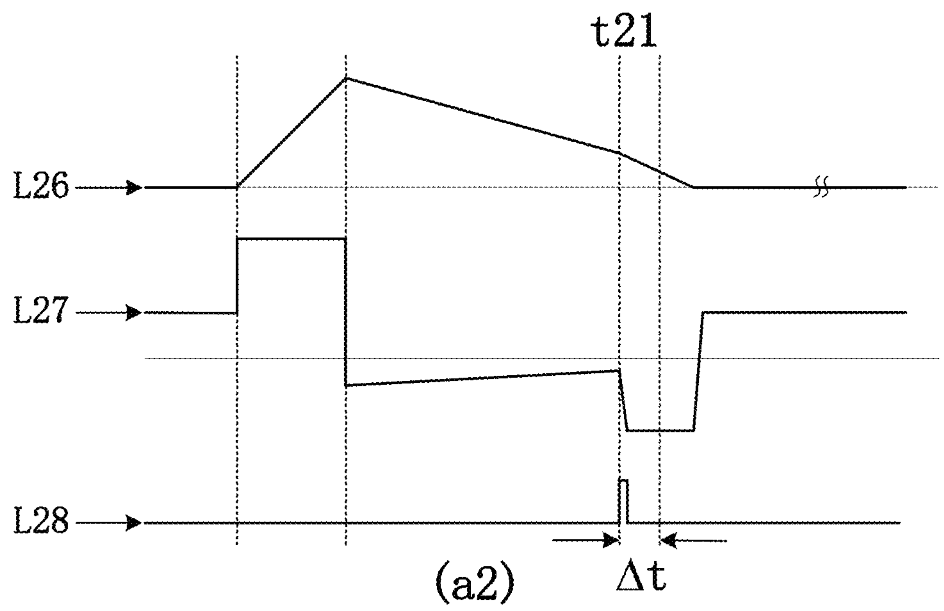
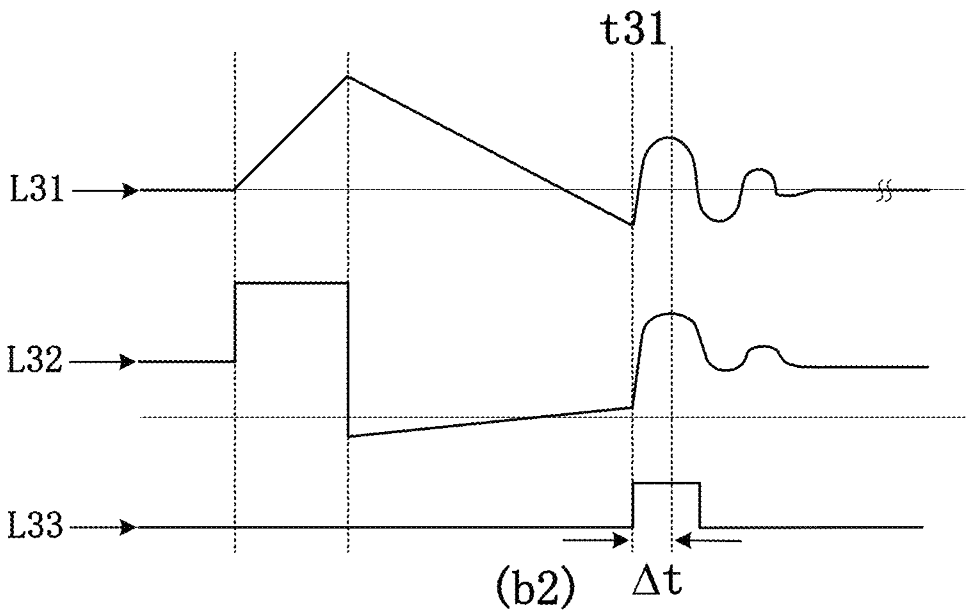
Figure 5

Figure 11:
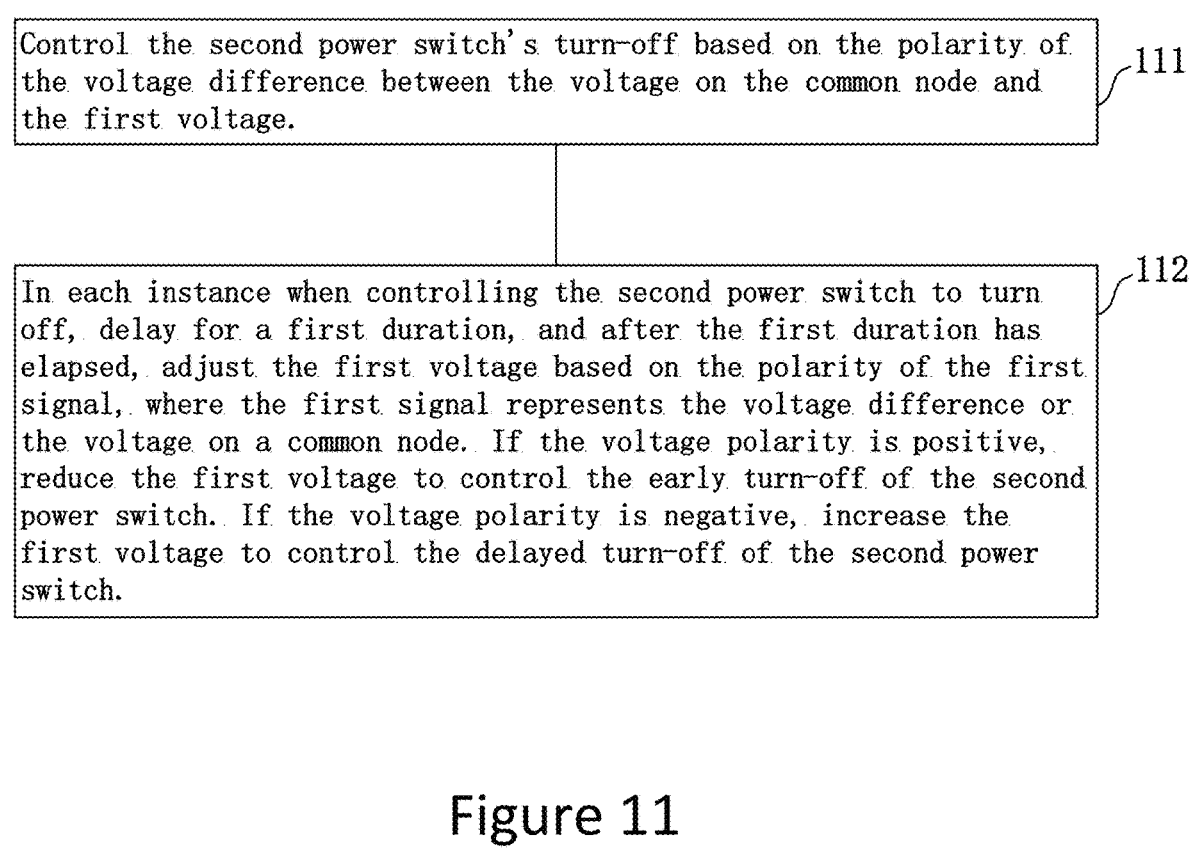

Control the second power switch's turn-off based on the polarity of the voltage difference between the voltage on the common node and the first voltage.

111

In each instance when controlling the second power switch to turn off, delay for a first duration, and after the first duration has elapsed, adjust the first voltage based on the polarity of the first signal, where the first signal represents the voltage difference or the voltage on a common node. If the voltage polarity is positive, reduce the first voltage to control the early turn-off of the second power switch. If the voltage polarity is negative, increase the first voltage to control the delayed turn-off of the second power switch.

SWITCH CONTROL CIRCUIT AND METHOD, POWER CONVERSION SYSTEM

RELATED APPLICATION

This application claims the benefit of and priority to Chinese Patent Application No. 2023112266185, filed on Sep. 22, 2023, which is hereby incorporated by reference in its entirety.

TECHNICAL FIELD

This application relates to the field of electronic circuit technology, particularly involving a switch control circuit and method, as well as a power conversion system.

BACKGROUND

Power conversion circuits (e.g., buck converters, step-down converters and the like) efficiently achieve voltage conversion from a high voltage to a low voltage by controlling the duration of ON and OFF of the upper and lower power switches separately, thereby achieving higher power conversion efficiency. Additionally, the common node of the two power switch devices is also connected to an inductor.

Power conversion circuits can operate in the Discontinuous Conduction Mode (DCM). Moreover, when the power conversion circuit operates in DCM, it is necessary to control the turn-off of the lower power switch at the moment of zero current flowing through the inductor to reduce power losses from the body diodes of the two power switches, thereby enhancing power conversion efficiency. Therefore, how to control the turn-off of the lower power switch at the instant of zero current flowing through the inductor becomes particularly crucial.

SUMMARY

This application aims to provide a switch control circuit and method, as well as a power conversion system, capable of controlling the turn-off of the second power switch near the instant of zero current flowing through the inductor to enhance power conversion efficiency.

To achieve the above objectives, this application provides, firstly, a switch control circuit applicable to a power conversion circuit. The power conversion circuit comprises a first power switch, a second power switch, and an inductor. The first power switch and the second power switch are connected in series between the input voltage bus and ground. The inductor is connected between a common node of the first power switch and the second power switch, and the output voltage bus. The switch control circuit includes a comparison branch and a feedback branch, with the comparison branch connected to the feedback branch.

The comparison branch is used to monitor the voltage at the common node (or switching node) and generate a control signal for turning off the second power switch based on the polarity of a voltage difference between the voltage on the common node and a first voltage. The feedback branch generates a feedback signal based on the polarity of a first signal after the comparison branch has turned off the second power switch and delayed for a first duration, and adjusts the first voltage based on this feedback signal. The first signal represents either the voltage difference or the voltage on the common node. If the polarity of the first signal is positive, the first voltage is reduced to enable the comparison branch to turn off the second power switch earlier. If the polarity of the first signal is negative, the first voltage is increased to delay the turn-off of the second power switch by the comparison branch.

In an optional configuration, the comparison branch includes a first comparator and a controller. Alternatively, the comparison branch includes a first comparator, a second comparator, and a controller. The controller is connected between the first comparator and the feedback branch.

The first comparator is used to generate a first comparison signal fed into the controller based on the voltage difference. The controller, upon a level transition of the first comparison signal, outputs the control signal and holds it. Simultaneously, it delays for the first duration and generates a pulse fed into the feedback branch. When the comparison branch includes only the first comparator and the controller, and does not include the second comparator, the feedback branch is further used to sample the first comparison signal based on the pulse and generate the feedback signal. The feedback signal is then used to adjust the first voltage.

When the comparison branch includes both the first comparator, the second comparator, and the controller, the second comparator is connected between the common node and the feedback branch. The second comparator generates a second comparison signal fed into the feedback branch based on the polarity of the voltage at the common node. The feedback branch is also used to sample the second comparison signal based on the pulse and generate the feedback signal, which is then used to adjust the first voltage.

In an optional configuration, when the comparison branch includes only the first comparator and the controller, and does not include the second comparator, the output of the first comparator is connected to the controller, and the controller is connected to the feedback branch. The first input of the first comparator is provided with the voltage difference, and the second input of the first comparator is grounded. Alternatively, the first input of the first comparator is connected to the voltage at the common node, and the second input of the first comparator is connected to the first voltage.

In an alternative configuration, when the comparison branch includes both the first comparator, the second comparator, and the controller, the first input of the second comparator is connected to the common node. The second input is grounded, and the output of the second comparator is connected to the feedback branch. The output of the first comparator is connected to the controller, and the controller is connected to the feedback branch. The first input of the first comparator is provided with the voltage difference, and the second input of the first comparator is grounded. Alternatively, the first input of the first comparator is connected to the voltage at the common node, and the second input of the first comparator is connected to the first voltage.

In an optional configuration, the feedback branch includes a D flip-flop and a voltage calibration unit, with the D flip-flop connected to the controller. The voltage calibration unit is used to adjust the first voltage based on the feedback signal. When the comparison branch includes only the first comparator and the controller, and does not include the second comparator, the D flip-flop is connected between the first comparator and the voltage calibration unit. The D flip-flop samples the first comparison signal upon receiving the pulse to generate the feedback signal and then outputs the feedback signal to the voltage calibration unit. When the comparison branch includes both the first comparator, the second comparator, and the controller, the D flip-flop is connected between the second comparator and the voltage calibration unit. The D flip-flop samples the second comparison signal upon receiving the pulse to generate the feedback signal and then outputs the feedback signal to the voltage calibration unit.

In an optional configuration, the clock input of the D flip-flop is connected to the controller to receive the pulse signal, and the output of the D flip-flop is connected to the voltage calibration unit to output the feedback signal to the voltage calibration unit. When the comparison branch includes only the first comparator and the controller, and does not include the second comparator, the signal input of the D flip-flop is connected to the output of the first comparator to receive the first comparison signal. When the comparison branch includes both the first comparator and the second comparator, and the controller, the signal input of the D flip-flop is connected to the output of the second comparator to receive the second comparison signal.

In an optional configuration, the voltage calibration unit is further used to configure most significant bit (MSB) of the digital correction code as 1, where the digital correction code comprises an N-bit binary number, and N is an integer greater than or equal to 1. Over N cycles, based on the feedback signal, sequentially set each bit of the digital correction code, from the MSB to the least significant bit (LSB), where each pulse corresponds to one cycle. After the N cycles, adjust the digital correction code linearly based on the feedback signal. Adjust the first voltage based on the digital correction code, where there is a positive correlation between the first voltage and the digital correction code.

In an optional configuration, the voltage calibration unit is also used to, within the N cycles, set the Kth bit of the digital correction code during the Kth cycle by setting the Kth bit as 1 and all bits after the Kth as 0. If the polarity of the voltage difference corresponding to the feedback signal is negative, then after the Kth cycle, maintain the Kth bit as 1. If the polarity of the voltage difference corresponding to the feedback signal is positive, then after the Kth cycle, set the Kth bit as 0. K ranges from 1 to N, where K equals 1 corresponding to the MSB, and K equals N corresponding to the LSB.

In an optional configuration, the voltage calibration unit is also used to, after the N cycles, increment the digital correction code by 1 if the polarity of the voltage difference corresponding to the feedback signal is negative. Conversely, decrement the digital correction code by 1 if the polarity of the voltage difference corresponding to the feedback signal is positive.

In an optional configuration, the voltage calibration unit is also used to, after the N cycles, calculate the difference between the digital correction code of the Ath cycle and the digital correction code of the (A−B)th cycle, where A is greater than B, and both A and B are greater than or equal to 1. If the calculated difference is greater than or equal to (A−1), then revert to configuring MSB of the digital correction code as 1.

In an optional configuration, the comparison branch also includes an adjustable voltage source. The adjustable voltage source is connected between the common node and the first comparator, or the adjustable voltage source is connected between the first comparator and ground. The adjustable voltage source is used to output the first voltage.

Secondly, this application provides a switch control method applicable to a power conversion circuit. The power conversion circuit comprises a first power switch, a second power switch, and an inductor. The first power switch and the second power switch are connected in series between the input voltage bus and ground. The inductor is connected between a common node of the first power switch and the second power switch, and the output voltage bus. The switch control method includes: controlling the turn-off of the second power switch based on the polarity of the voltage difference between the voltage at the common node and the first voltage, delaying for a first duration in each instance of controlling the turn-off of the second power switch and, after the first duration has elapsed, adjusting the first voltage based on the polarity of the first signal, where the first signal represents either the voltage difference or the voltage at the common node. If the voltage polarity is positive, reduce the first voltage to control the early turn-off of the second power switch. If the voltage polarity is negative, increase the first voltage to control the delayed turn-off of the second power switch.

In an optional configuration, controlling the turn-off of the second power switch based on the polarity of the voltage difference between the voltage on the common node and the first voltage includes controlling the turn-off of the second power switch when the polarity of the voltage difference changes.

In an optional configuration, adjusting the first voltage based on the polarity of the first signal includes configuring the MSB of the digital correction code as 1. The digital correction code comprises an N-bit binary number, where N is an integer greater than or equal to 1. Over N cycles, set each bit of the digital correction code sequentially, from the MSB to the LSB, based on the polarity of the first signal. After the N cycles, adjust the digital correction code linearly based on the polarity of the first signal. Adjust the first voltage based on the digital correction code, where there is a positive correlation between the first voltage and the digital correction code.

In an optional configuration, when sequentially setting each bit of the digital correction code over N cycles based on the polarity of the first signal, it includes setting the Kth bit of the digital correction code as 1 during the Kth cycle within the N cycles and setting all bits after the Kth as 0. If the polarity of the first signal is negative, then after the Kth cycle, maintain the Kth bit as 1. If the polarity of the first signal is positive, then after the Kth cycle, set the Kth bit as 0. K increases from 1 in sequence up to N.

In an optional configuration, after the N cycles, linearly adjusting the digital correction code based on the polarity of the first signal includes, after the N cycles, incrementing the digital correction code by 1 if the polarity of the first signal is negative. Conversely, decrementing the digital correction code by 1 if the polarity of the first signal is positive.

In an optional configuration, the method further includes, after the N cycles, calculating the difference between the digital correction code of the A-th cycle and the digital correction code of the (A−B)th cycle, where A is greater than B, and both A and B are greater than or equal to 1. If the calculated difference is greater than or equal to (A−1), then revert to configuring MSB of the digital correction code as 1.

Thirdly, this application provides a power conversion system comprising a power conversion circuit and the switch control circuit as described above. The power conversion circuit includes a first power switch, a second power switch, and an inductor. The first power switch and the second power switch are connected in series between the input voltage bus and ground. The inductor is connected between a common node of the first power switch and the second power switch, and the output voltage bus. The switch control circuit is connected to the common node and is used to control the turn-off of the second power switch.

The advantageous effects of this application are as follows: the switch control circuit provided in this application is applied to a power conversion circuit. The power conversion circuit comprises a first power switch, a second power switch, and an inductor. The first power switch and the second power switch are connected in series between the input voltage bus and ground. The inductor is connected between a common node of the first power switch and the second power switch and the output voltage bus. The switch control circuit comprises a comparison branch and a feedback branch, with the comparison branch connected to the feedback branch. The comparison branch is used to receive the voltage at the common node and generate a control signal for turning off the second power switch based on the polarity of the voltage difference between the common node voltage and the first voltage. The feedback branch is used to generate a feedback signal based on the polarity of the first signal after the comparison branch turns off the second power switch and delays for a first duration, and it is further used to adjust the first voltage based on the feedback signal. The first signal represents either the voltage difference or the voltage on the common node. If the polarity of the first signal is positive, then the first voltage is reduced to cause the comparison branch to turn off the second power switch earlier. If the polarity of the first signal is negative, then the first voltage is increased to cause the comparison branch to delay the turn-off of the second power switch. It can be seen that when the polarity of the first signal is positive, it can be determined that the residual current flowing through the inductor at the time of turning off the second power switch is less than zero (with the current flowing from the common node to the output voltage bus considered as positive current). Consequently, it can be determined that the second power switch turns off late, and in such a case, reducing the first voltage is used to advance the turn-off of the second power switch. Conversely, when the polarity of the first signal is negative, it can be determined that the residual current flowing through the inductor at the time of turning off the second power switch is greater than zero, and it can be determined that the second power switch turns off early. In such a case, increasing the first voltage is used to delay the turn-off of the second power switch. Through this continuous adjustment process, it is ultimately possible to control the turn-off of the second power switch near the moment when the current flowing through the inductor crosses zero, thus improving the power conversion efficiency.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 2 is a waveform diagram of various signals in the circuit structure shown in FIG. 1;

FIG. 5 is a waveform diagram of various signals in the power conversion circuit of the related art;

FIG. 11 is a flowchart of the switch control method provided in one embodiment of this application;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

In order to provide a clearer and more complete description of the objectives, technical solutions, and advantages of the embodiments of this application, the technical solutions in the embodiments of this application will be described clearly and comprehensively with reference to the drawings in these embodiments. It is evident that the described embodiments are a part of the embodiments of this application, and not the entirety of the embodiments. Based on the embodiments in this application, all other embodiments that those skilled in the art may obtain without engaging in creative work are within the scope of protection of this application.

Figure 1:
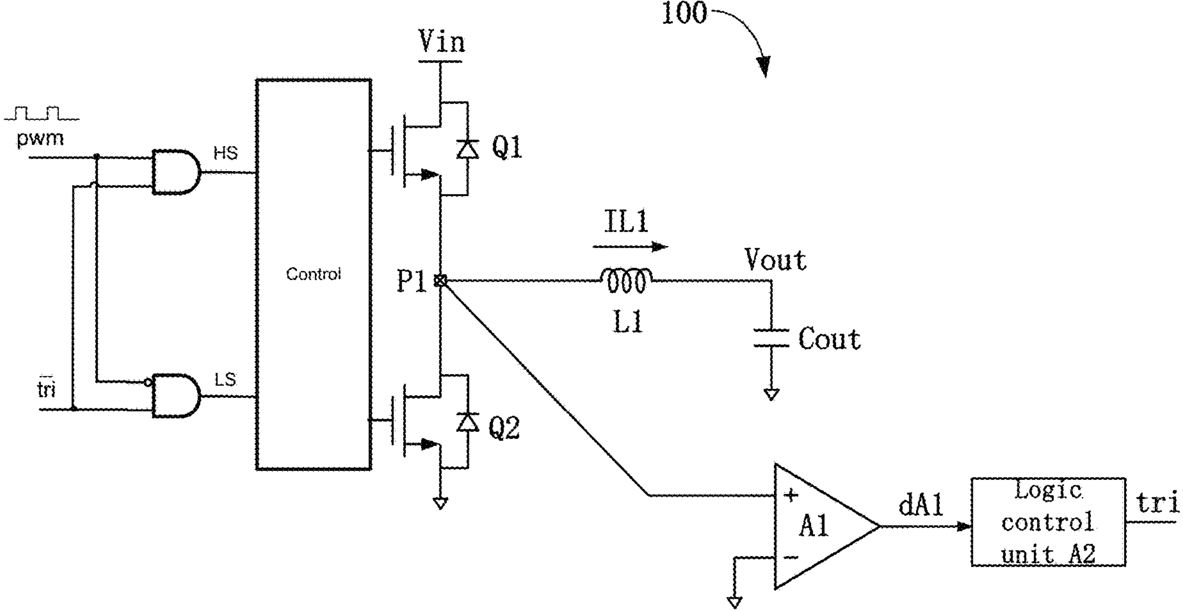
FIG. 1 is a schematic diagram of the circuit structure of a power conversion circuit in the related art.

FIG. 1 is a schematic diagram of a power conversion circuit 100 in the related art. As shown in FIG. 1, the power conversion circuit 100 includes a first power switch Q1, a second power switch Q2, and an inductor L1. The first power switch Q1 and the second power switch Q2 are connected between the input voltage bus Vin and ground. The inductor L1 is connected between a common node P1 of the first power switch Q1 and the second power switch Q2, and the output voltage bus Vout.

The power conversion circuit 100 also includes an output capacitor Cout, a comparator A1, and a logic control unit A2. The output capacitor Cout is connected between the output voltage bus Vout and ground. The non-inverting input of the comparator A1 is connected to the common node P1. The inverting input of the comparator A1 is grounded. The output of the comparator A1 is connected to the input of the logic control unit A2. The logic control unit A2 outputs an indicator signal tri that represents the power conversion circuit 100 entering a high-impedance state. In response to the tri signal in a logic high state, the gate control PWM signal of the first power switch Q1 and the second power switch Q2 are blocked, such that both power switches are controlled to be turned off.

Specifically, the power conversion circuit 100 efficiently converts the high voltage from the input voltage bus Vin to the low voltage on the output voltage bus Vout by controlling the ON and OFF of the first power switch Q1 and the second power switch Q2 separately. Depending on the magnitude of the current flowing into the load connected to the output voltage bus Vout, the power conversion circuit 100 can operate in a Continuous Conduction Mode (CCM) or a Pulse Width Modulation (PWM) mode, as well as in a Discontinuous Conduction Mode (DCM) or a Pulse Frequency Modulation (PFM) mode. The polarity of the voltage at the common node P1 is detected by the comparator during the conduction time of the second power switch Q2. This helps determine the polarity of the current IL1 flowing through the inductor L1. In various embodiments described in this application, the positive polarity corresponds to the current flowing from the common node P1 to the output voltage bus Vout as shown in FIG. 1. Based on this determination, it generates an indicator signal tri that represents the power conversion circuit 100 entering a high-impedance state.

Please refer to both FIG. 1 and FIG. 2. FIG. 2 illustrates waveform diagrams of various signals in the circuit shown in FIG. 1. As shown in part (a1) of FIG. 2, part (a1) represents the signals in CCM mode. In this part, the following signals are depicted: Curve L11 represents the PWM signal; Curve L12 represents the inductor current IL1; Curve L13 represents the voltage at the common node P1; Curve L14 represents the output signal dA1 from comparator A1; and Curve L15 represents the indicator signal tri.

As shown in part (b1) of FIG. 2, part (b1) illustrates the waveforms of signals in DCM mode. In this part, the following signals are depicted: Curve L21 represents the PWM signal; Curve L22 represents the inductor current IL1; Curve L23 represents the voltage at the common node P1; Curve L24 represents the output signal dA1 from comparator A1; and Curve L25 represents the indicator signal tri.

In this context, the first power switch Q1 and the second power switch Q2 are controlled by the PWM signal and the indicator signal tri as shown in FIG. 1. The PWM signal and an inverted indicator signal tri are fed into a first AND gate where a high side gate drive signal HS is generated as shown in FIG. 1. The inverted PWM signal and the inverted indicator signal tri are fed into a second AND gate where a low side gate drive signal LS is generated as shown in FIG. 1. Both HS and LS are fed into a control unit. The control unit is configured to generate gate drive signals for Q1 and Q2, respectively.

Specifically, when the PWM signal is high, the first power switch Q1 is driven to turn on, and at the same time, the second power switch Q2 is driven to turn off. The voltage on the input voltage bus Vin charges the inductor L1, and the current IL1 flowing through inductor L1 continues to increase. After a certain time, the PWM signal transitions to a low level. The first power switch Q1 is driven to turn off, and at the same time, the second power switch Q2 is driven to turn on. The common node P1 is connected to ground after Q2 is turned on. Then, the current IL1 flowing through inductor L1 begins to decrease. In the CCM mode, the current IL1 is always greater than zero, which means that in the conduction period of the second power switch Q2, the voltage on the common node P1 is negative due to the influence of the conduction resistance of the second power switch Q2. Therefore, the signal dA1 output by comparator A1 remains low, keeping the indicator signal tri low. In the DCM mode, after the PWM signal transitions from a high level to a low level, the continuously decreasing current IL1 through inductor L1 will reach zero, and the voltage on the common node P1 will increase from negative to above zero. At this point, the signal dA1 output by comparator A1 transitions from a low level to a high level, causing the indicator signal tri to also go high. Then, both the first power switch Q1 and the second power switch Q2 are driven to turn off, and the common node P1 enters a high-impedance state. This process continues until the next cycle, when the PWM signal returns to a high level and resets the indicator signal tri to a low level, repeating the entire operation process.

As analyzed based on the above operational process, the comparator A1 plays a critical role in the DCM mode. On the one hand, the comparator A1 can detect the moment when the current IL1 crosses zero, and then promptly turn off the second power switch Q2 at that moment. Prematurely turning off the second power switch Q2 would cause the residual current on the inductor L1 to flow into the common node P1 from the ground terminal via the body diode of the second power switch Q2. Delayed turn-off of the second power switch Q2 would lead to the residual current on the inductor L1 flowing into the input voltage bus Vin via the body diode of the first power switch Q1 until the current IL1 drops to zero. During this time, a significant amount of power would be wasted on the body diodes, particularly under light loads, greatly reducing the power conversion efficiency of the power conversion circuit 100. On the other hand, when the current on the load changes, it is possible to dynamically control the power conversion circuit 100 to switch between the DCM mode and CCM mode based on the output status of the comparator A1, thereby optimizing the power conversion efficiency across the entire range of load currents.

However, the comparator A1 itself has input equivalent offset voltage and propagation delays, which directly affect the accuracy of voltage detection at the common node P1. This, in turn, leads to inaccurate timing for turning off the second power switch Q2 in the DCM mode and an increase in the error of the residual current flowing through the inductor at the moment when the second power switch Q2 is turned off. Designing a comparator with a very low offset voltage and an extremely short propagation delay is challenging, and these two aspects often involve trade-offs. For instance, reducing the offset voltage often requires increasing the area (e.g., size) of transistors in the circuit to reduce mismatch, but this increases the parasitic capacitance at internal nodes, leading to a longer propagation delay. Even if the offset voltage or propagation delay of the comparator A1 is calibrated, it is not possible to accurately control the timing of turning off the second power switch Q2 under various operating conditions so that the residual current flowing through inductor L1 is close to zero when the second power switch Q2 is turned off.

Based on this, the present application provides a switch control circuit. This switch control circuit dynamically adjusts the timing of turning off the second power switch Q2 in real-time based on the polarity of the voltage at the common node P1 caused by the residual current flowing through the inductor L1 after the second power switch Q2 is turned off. This adjustment aims to ensure that the residual current flowing through inductor L1 is close to zero when the second power switch Q2 is turned off, thus maximizing the power conversion efficiency of the power conversion circuit 100.

Figure 3:
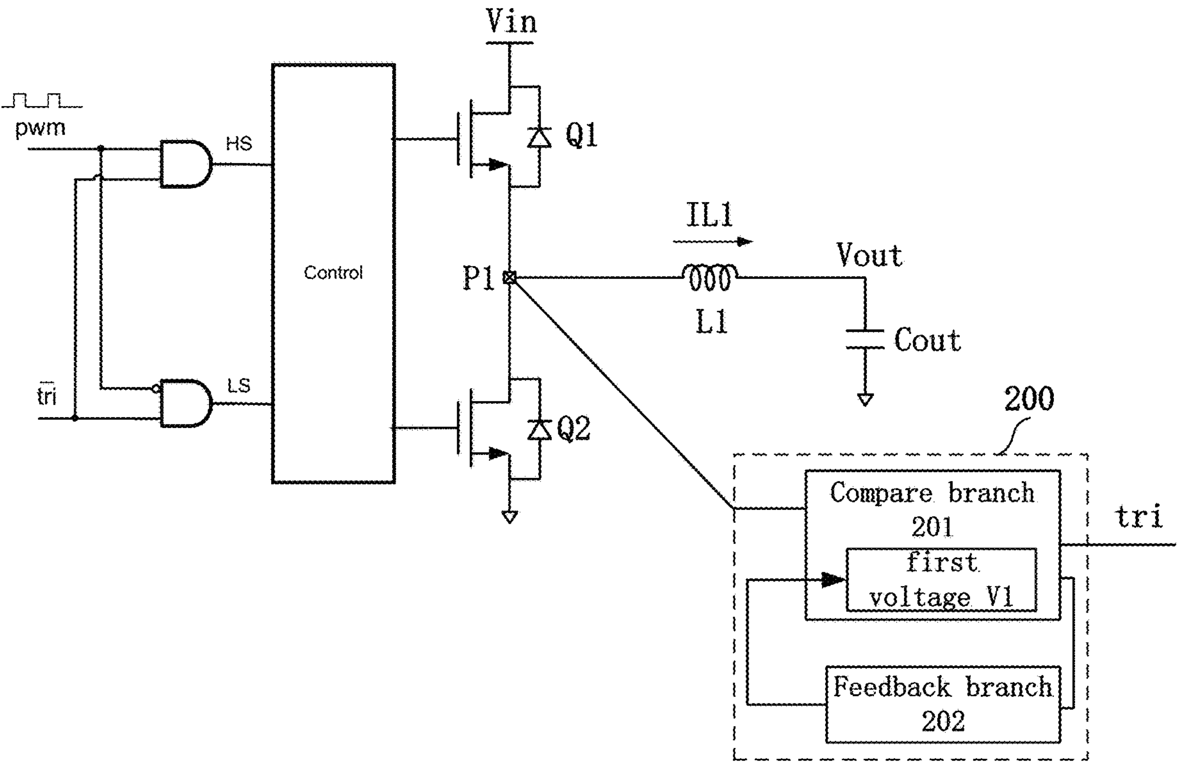
FIG. 3 is a block diagram of the switch control circuit provided in one embodiment of this application.

FIG. 3 is a schematic diagram illustrating the structure of the switch control circuit 200 provided in an embodiment of the present application. This switch control circuit 200 is applied to the power conversion circuit. The power conversion circuit includes the first power switch Q1, the second power switch Q2, and the inductor L1. The first power switch Q1 and the second power switch Q2 are connected in series between the input voltage bus Vin and ground. The inductor L1 is connected between the common node P1 of the first power switch Q1 and the second power switch Q2 and the output voltage bus Vout. For detailed explanations regarding the power conversion circuit are discussed above with respect to FIGS. 1 and 2, and hence are not repeated again herein.

As shown in FIG. 3, the switch control circuit 200 comprises a comparison branch 201 and a feedback branch 202. The comparison branch 201 is connected to the feedback branch 202.

Specifically, the comparison branch 201 is used to receive the voltage on the common node P1 and, based on the polarity of the voltage difference between the common node P1 and the first voltage V1, it outputs the control signal to turn off the second power switch Q2. If the first voltage V1 increases, it will cause the comparison branch 201 to delay the turning off the second power switch Q2. If the first voltage V1 decreases, it will cause the comparison branch 201 to advance the turning off of the second power switch Q2. The feedback branch 202 is used to generate a feedback signal based on the polarity of the voltage difference sampled at a first duration after the comparison branch 201 turns off the second power switch Q2. This feedback signal is then used to adjust the first voltage V1. Specifically, if the polarity of the voltage difference is positive, the first voltage V1 is reduced to make the comparison branch 201 turn off the second power switch Q2 earlier. If the polarity of the voltage difference is negative, the first voltage V1 is increased to make the comparison branch 201 delay the turning off the second power switch Q2. The polarity of both the first voltage V1 and the voltage difference could be either positive or negative.

In this embodiment, assume that in the current cycle, the comparison branch 201 controls the turning off of the second power switch Q2. Then, after a delay of the first duration, the feedback branch 202 determines that the polarity of the voltage difference between the voltage at the common node P1 and the first voltage V1 is negative. Based on this, it determines that, at the time of turning off the second power switch Q2, a residual current IL1 flowing through the inductor L1 is greater than zero (considering the current flowing from the common node P1 to the output voltage bus Vout as a positive current), which in turn indicates that the second power switch Q2 is turned off early. In this case, it is necessary to increase the first voltage V1, which will cause the comparison branch 201 to delay the output of the control signal for turning off the second power switch Q2 in the next cycle, thereby delaying the turning off the second power switch Q2.

Assume that in the current cycle, the comparison branch 201 controls the turning off of the second power switch Q2. Then, after a delay of the first duration, the feedback branch 202 determines that the polarity of the voltage difference is positive. Based on this, it determines that, at the time of turning off the second power switch Q2, a residual current flowing through the inductor is less than zero. Consequently, it indicates that the second power switch Q2 is turned off late. In this case, it is necessary to decrease the first voltage V1, which will cause the comparison branch 201 to advance the output of the control signal for turning off the second power switch Q2 in the next cycle, thereby advancing the turning off the second power switch Q2.

Through the continuous adjustment process described above, it is possible to ultimately achieve the control of the second power switch Q2. The second power switch Q2 is turned off near the moment when the current IL1 flowing through the inductor L1 crosses zero. This, in turn, helps to improve the efficiency of power conversion.

Figure 4:
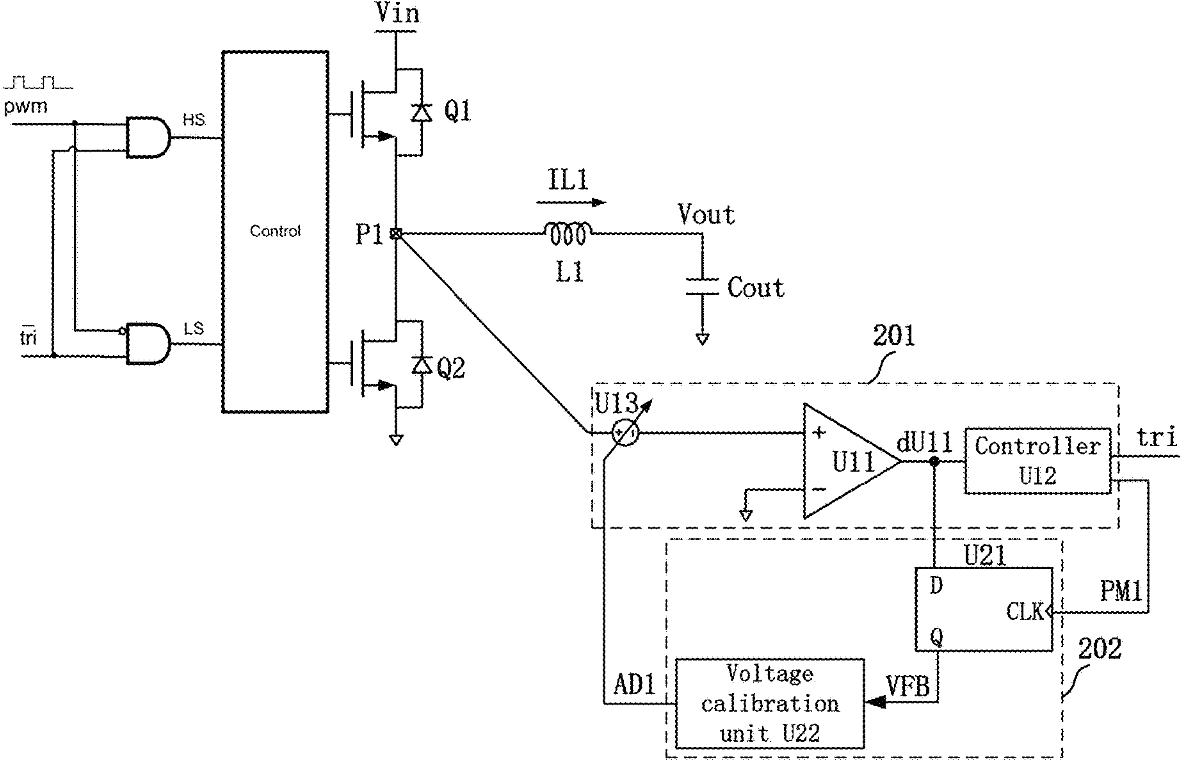
FIG. 4 is a schematic diagram of the circuit structure corresponding to the block diagram shown in FIG. 3.

Please refer to FIG. 4, which exemplifies the first circuit structure corresponding to the one shown in FIG. 3.

In one embodiment, as shown in FIG. 4, the comparison branch 201 comprises a first comparator U11 and a controller U12. The controller U12 is connected between the first comparator U11 and the feedback branch 202.

Specifically, the first input of the first comparator U11 receives the voltage difference. The second input of the first comparator U11 is grounded, and the output of the first comparator U11 is connected to the controller U12. The controller U12 is connected to the feedback branch 202. In this embodiment, the first input of the first comparator U11 serves as the non-inverting input, and the second input serves as the inverted input.

In this embodiment, the first comparator U11 is used to generate the first comparison signal dU11 fed into the controller U12 based on the voltage difference between the voltage on the common node P1 and the first voltage V1. The controller U12 is responsible for producing and maintaining a control signal tri when the level of the first comparison signal dU11 changes, and then it generates a pulse after a first duration. The feedback branch 202 is also used to sample the first comparison signal dU11 based on this pulse and generate a feedback signal, which, in turn, is used to adjust the first voltage V1.

The PWM signal and an inverted indicator signal tri are fed into a first AND gate where a high side gate drive signal HS is generated as shown in FIG. 4. The inverted PWM signal and the inverted indicator signal tri are fed into a second AND gate where a low side gate drive signal LS is generated as shown in FIG. 4. Both HS and LS are fed into a control unit. The control unit is configured to generate gate drive signals for Q1 and Q2, respectively.

In one embodiment, as shown in FIG. 4, the comparison branch 201 also includes an adjustable voltage source U13. The adjustable voltage source U13 is connected between the common node P1 and the first comparator U11. The adjustable voltage source U13 is used to output the first voltage V1.

In one embodiment, as shown in FIG. 4, the feedback branch 202 includes a D flip-flop U21 and a voltage calibration unit U22. The D flip-flop U21 is connected to the controller U12 and is positioned between the first comparator U11 and the voltage calibration unit U22. Specifically, the clock input CLK of the D flip-flop U21 is connected to the controller U12 to receive the pulse signal PM1. The output Q of the D flip-flop U21 is connected to the voltage calibration unit U22. The D flip-flop U21 outputs the feedback signal VFB. The signal input D of the D flip-flop U21 is connected to the output of the first comparator U11 to receive the first comparison signal dU11.

Specifically, the voltage calibration unit U22 is used to adjust the first voltage V1 based on the feedback signal VFB. The D flip-flop U21 samples the first comparison signal dU11 when it receives a pulse to generate the feedback signal VFB and outputs the feedback signal VFB fed into the voltage calibration unit U22.

The operation of the circuit structure shown in FIG. 4 will be explained in the following, with reference to FIGS. 5 and 6.

In FIG. 5, the (a2) part depicts various signals in a power conversion circuit in the related art (such as the power conversion circuit shown in FIG. 1), where the residual current flowing through the inductor L1 is greater than zero when the second power switch Q2 is turned off. Curve L26 represents the inductor current IL1; Curve L27 shows the voltage on the common node P1. Curve L28 represents the output signal dU11 from comparator U11. In the (b2) part of FIG. 5, it depicts various signals in a power conversion circuit in the related art where the residual current on inductor L1 is less than zero when the second power switch Q2 is turned off. Curve L31 represents the inductor current IL1; Curve L32 shows the voltage at the common node P1; Curve L33 represents the output signal dU11 from comparator U11.

As shown in the (a2) part of FIG. 5, at a time instant t21, the second power switch Q2 is turned off. At this moment, the residual current IL1 flowing through the inductor L1 is greater than zero. Because both the first power switch Q1 and the second power switch Q2 are turned off, the current IL1 flowing through the inductor L1 has to source current from the ground terminal through the body diode of the second power switch Q2 into the common node P1 to sustain its current. Due to the conduction of the body diode of the second power switch Q2, the voltage on the common node P1 is approximately equal to −0.7V during this period (when the body diode of power switch Q2 is conducting), until the current IL1 decreases to zero, at which point the voltage at common node P1 stabilizes to a voltage level equal to the voltage of the output voltage bus Vout.

As shown in the (b2) part of FIG. 5, at a time instant t31, the second power switch Q2 is turned off. At this moment, the residual current IL1 flowing through the inductor L1 is less than zero. Since both the first power switch Q1 and the second power switch Q2 are turned off, the negative current IL1 is pushed to flow into the input voltage bus Vin through the body diode of the first power switch Q1 to sustain the inductor current, causing the voltage on the common node P1 to momentarily rise to a voltage level equal to Vin+0.7V. Subsequently, due to the high impedance state of the common node P1, resonance occurs between the inductor L1 and the parasitic capacitance of the common node P1, causing the voltage at the common node P1 to oscillate for a long time before stabilizing to a voltage level equal to the voltage of the output voltage bus Vout. The period of the oscillation is determined by the inductance of the inductor L1 and the parasitic capacitance at the common node P1.

Subsequently, if an appropriate time (Δt as shown in FIG. 5, corresponding to the first duration in the above-mentioned embodiment) is waited after the moment when the second power switch Q2 is turned off (i.e., when the indicator signal tri changes from a low level to a high level), the polarity of the voltage at the common node P1 is sampled and determined once again. At this point, if the voltage on the common node P1 is negative, it indicates that the residual current IL1 flowing through the inductor L1 is still greater than zero when the second power switch Q2 is turned off. Conversely, if the voltage on the common node P1 is positive, it indicates that the residual current IL1 flowing through the inductor L1 is less than zero. In the embodiment shown in FIG. 5, the polarity determination of the voltage on the common node P1 is implemented by reusing the first comparator U11. It is worth mentioning that the delay of the first duration Δt is critical, as the voltage on the common node P1 at a proper first duration Δt after the second power switch Q2 is turned off has much greater amplitude. As show in FIG. 5, after the delay of Δt from t21 and t31 respectively, the voltage on the common node P1 is equal to about −0.7 v in the case turning off Q2 too early (a2) and a few volts in the case of turning off Q2 too late (b2). This way, it is much easier to determine their polarity, which allows the use of less accurate and simpler comparator circuits. On the contrary, if the voltage on the common node P1 is sampled right after the second power switch Q2 is turned off, as shown in FIG. 5 (a2), (b2), the voltage at the common node P1 at t21 and t31 time instances are very close to 0V, which requires a high precision comparator with great tolerance to noise to distinguish its polarity. In some cases, the first duration Δt can be strategically selected to be equal to about a quarter of the resonance period of the LC resonance formed by the inductor and parasitic capacitance at the common node P1, such that the largest difference in voltage between the case of Q2 turning off too soon or Q2 turning off too late can be sampled. In some embodiments, as shown in FIG. 4, the voltage on the common node P1 is not directly used as the input of the first comparator U11, but rather the difference between the voltage on the common node P1 and the first voltage V1. Although the first voltage V1 is expected to be small, it may be comparable to the voltage on the common node P1 that is sampled right at the moment at which the second power switch Q2 is turned off. As a result, in order to ensure that the difference between the voltage on the common node P1 and the first voltage V1 correctly reflects the polarity of the voltage on the common node P1, such that the first comparator U11 can be reused to provide input to the feedback loop, a proper delay of the first duration Δt is required.

Furthermore, as shown in FIG. 4, an adjustable voltage source U13 is introduced at the non-inverting input of the first comparator U11. The first voltage V1 output by the adjustable voltage source U13 linearly increases with the increase of the calibration signal AD1 output by the voltage calibration unit U22, or the first voltage V1 linearly decreases with the decrease of the calibration signal AD1.

Figure 6:
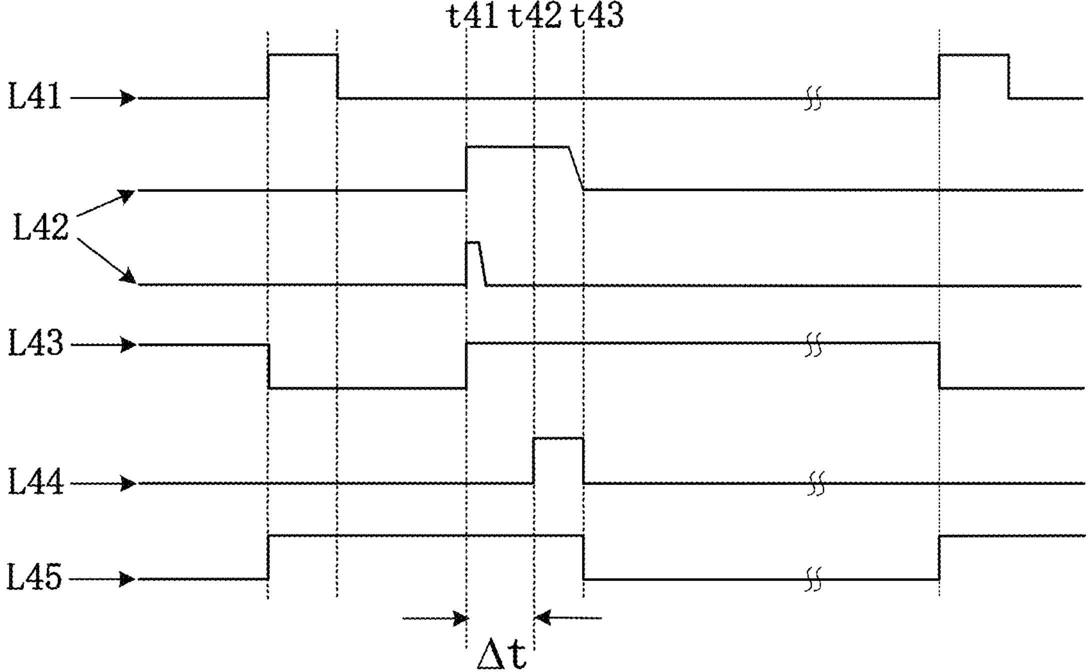
FIG. 6 is a waveform diagram of various signals in the circuit structure shown in FIG. 4.

FIG. 6 illustrates the waveforms of various signals in the circuit shown in FIG. 4. As shown in FIG. 6, curve L41 represents the PWM signals controlling the first power switch Q1 and the second power switch Q2. Curve LA2 depicts two possible waveforms of the output signal of the first comparator U11, denoted as the first comparison signal dU11. Curve L43 represents the control signal tri output by the controller U12. Curve L44 shows the signal PM1 output by the controller U12 after outputting the control signal tri and delaying it by the first duration Δt. Curve L45 represents the enable signal for the first comparator U11.

Specifically, after each transition of the first comparison signal dU11 from low to high, the controller U12 causes the control signal tri to transition from low to high, while simultaneously initiate the generation of the signal PM1. The rising edge of the PM1 signal is delayed by the first duration Δt compared to the rising edge of the control signal tri (where the time between moments t41 and t42 is the first duration). In some implementations, the first duration can be set to 30 ns. Then, at the rising edge of the PM1 signal, the D flipflop U21 is used once again to check the output state of the first comparator U11. If, at this time, the first comparison signal dU11 is low, this indicates that the residual current IL1 flowing through the inductor L1 is greater than zero when the second power switch Q2 is turned off. Then, in the next cycle, the calibration signal AD1 should be increased to increase the input equivalent offset voltage of the first comparator U11 (achieved by increasing the first voltage V1 output from the adjustable voltage source U13). Consequently, the voltage at the common node P1 needs to be slightly higher to make the first comparison signal dU11 transition from low to high. As a result, in the cycle when the first comparison signal dU11 transitions from low to high, the residual current IL1 flowing through the inductor L1 is also smaller than that in the previous cycle and closer to zero.

On the other hand, if the first comparison signal dU11 is high, this indicates that the residual current IL1 flowing through the inductor L1 is less than zero when the second power switch Q2 is turned off. Then in the next cycle, the calibration signal AD1 should be decreased to reduce the input equivalent offset voltage (first voltage V1) of the comparator. By this way, the voltage on the common node P1 can be slightly lower to make the first comparison signal dU11 transition from low to high. As a result, in the cycle when the first comparison signal dU11 transitions from low to high, the residual current IL1 flowing through the inductor L1 is also less negative than that in the previous cycle and closer to zero.

Eventually, the calibration signal AD1 stabilizes between two states with the smallest difference in adjustment steps, and the corresponding residual current IL1 flowing through the inductor L1 alternates between slightly above and slightly below zero. The error in the residual current IL1 flowing through the inductor L1 can be minimized. For example, it is less than 50 mA. As a result, when the control signal tri transitions from low to high, and the power conversion circuit operates in a high-impedance state, the voltage on the common node P1 can quickly stabilize to a voltage level equal to the voltage on the output voltage bus Vout, minimizing power losses on the body diodes of the first power switch Q1 or the second power switch Q2.

Typically, the enable signal of the first comparator U11 is high only during the conduction of either the first power switch Q1 or the second power switch Q2. After the control signal tri transitions to a high level, the enable signal of the first comparator U11 goes low to disable the first comparator U11, reducing static power consumption during the high-impedance state, which is especially effective when the high-impedance state is prolonged, such as under very light load conditions.

However, in the embodiment of this application, the enable signal of the first comparator U11 is extended slightly beyond the turning off of the second power switch Q2. This is because the output status of the first comparator U11 needs to be resampled at the rising edge of the signal PM1. (As shown in curve L45, the duration of the enable signal for the first comparator U11 is extended to time t43). This extension in time is negligible compared to the entire switching cycle, and the additional power consumption it causes is also negligible.

Furthermore, to expedite the calibration process described above in order to find a stable calibration signal AD1, the embodiments of this application propose an adaptive calibration algorithm implemented by the voltage calibration unit U22. Specifically, the voltage calibration unit U22 is used to perform the following method steps: first, configuring MSB of the digital correction code as 1 and all other bits as 0. The digital correction code comprises an N-bit binary number, and N is an integer greater than or equal to 1. Over N cycles, based on feedback signals, sequentially setting each bit of the digital correction code to the corresponding binary value from the most significant bit to the least significant bit, with each pulse corresponding to one cycle. After N cycles, linearly adjusting the digital correction code based on feedback signals. Adjusting the first voltage based on the digital correction code, where there is a positive correlation between the first voltage and the digital correction code.

The digital correction code corresponds to the calibration signal AD1, as described in the embodiments above.

Specifically, in some embodiments, the specific implementation process of the step where the voltage calibration unit U22 sequentially sets the binary values corresponding to each bit of the digital correction code from the most significant bit to the least significant bit based on the feedback signal within N cycles is as follows: in N cycles, when setting the K-th bit of the digital correction code during the K-th cycle, the K-th bit of the digital correction code is set to 1, and the bits after the K-th bit are set to 0. If the polarity of the voltage difference corresponding to the feedback signal is negative, then after the K-th cycle (including at the end of the K-th cycle or at any time after the end of the K-th cycle, for example, in the (K+1)-th cycle), the K-th bit is kept as 1. If the polarity of the voltage difference corresponding to the feedback signal is positive, then after the K-th cycle, the K-th bit is set to 0. K increases from 1 to N in sequence, with K being 1 corresponding to the most significant bit, and K being N corresponding to the least significant bit.

In some embodiment, N is equal to 3. First, for K=1, during the first cycle, MSB of the digital correction code is set to 1, and the bits after MSB are set to 0. If the polarity of the voltage difference corresponding to the feedback signal during the first cycle is negative, then after the first cycle, MSB is kept as 1. If the polarity of the voltage difference corresponding to the feedback signal during the first cycle is positive, then after the first cycle, MSB is set to 0. Next, for K=2, during the second cycle, the second bit of the digital correction code is set to 1, and the bits after the second bit are set to 0. If the polarity of the voltage difference corresponding to the feedback signal during the second cycle is negative, then after the second cycle, the second bit is kept as 1. If the polarity of the voltage difference corresponding to the feedback signal during the second cycle is positive, then after the second cycle, the second bit is set to 0. Finally, for K=3, during the third cycle, the third bit of the digital correction code is set to 1, and the bits after the third bit are set to 0. If the polarity of the voltage difference corresponding to the feedback signal during the third cycle is negative, then after the third cycle, the third bit is kept as 1. If the polarity of the voltage difference corresponding to the feedback signal during the third cycle is positive, then after the third cycle, the third bit is set to 0. This completes the setting of the three-bit binary digital correction code.

Figure 13:
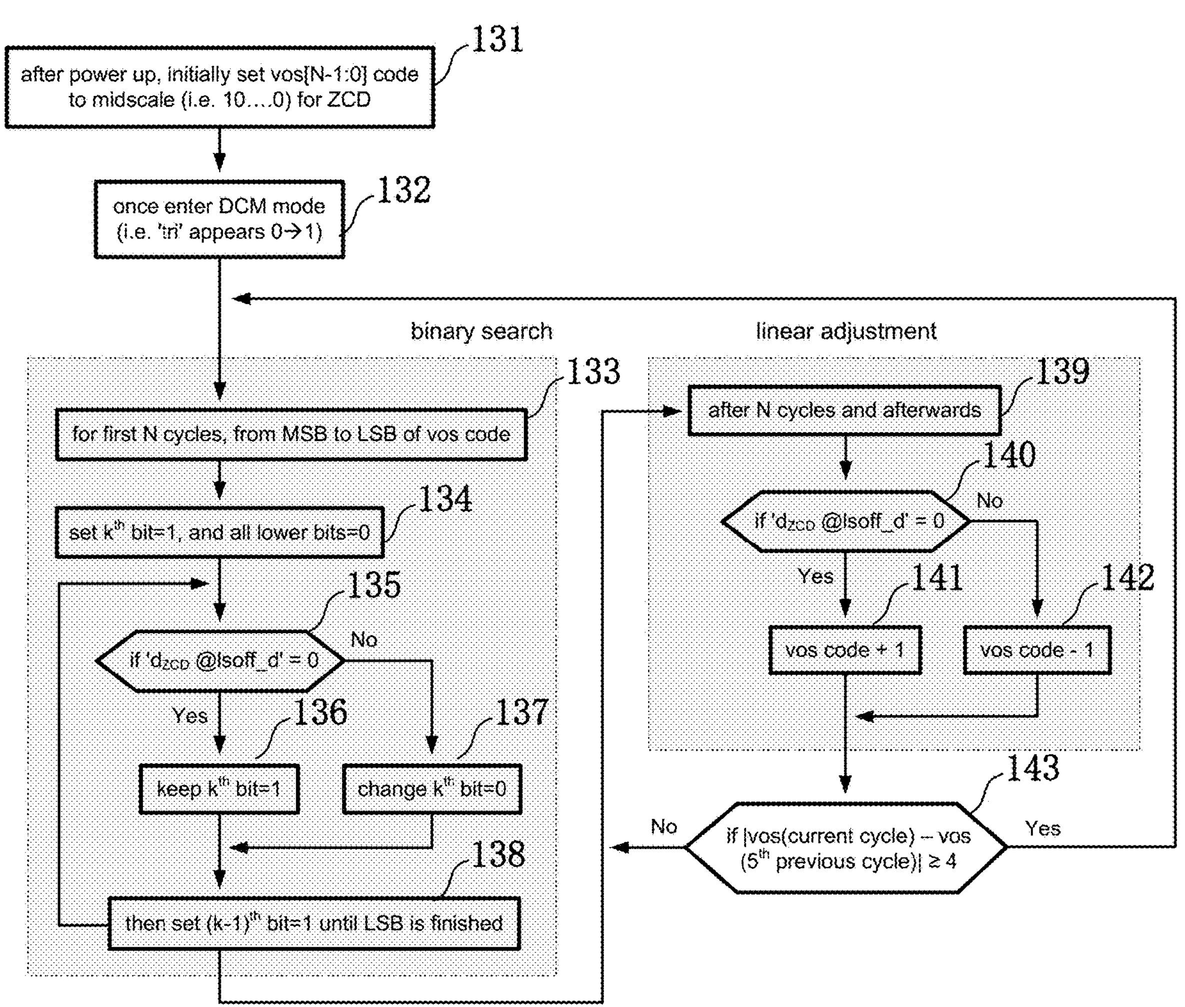
FIG. 13 is a flowchart of a calibration algorithm provided in one embodiment of this application.

In this embodiment, after powering up the switch control circuit, the digital correction code is initially set to the middle value (i.e., MSB of the digital correction code is set to 1, resulting in 10 . . . 0). See step 131 of FIG. 13. Then, when the power conversion circuit enters a DCM mode (e.g., step 132 of FIG. 13), the procedure is as follows: first, set the Kth bit of the digital correction code (with K starting from the MSB and incrementing from 1, 2, . . . N to LSB) to 1 and set all other bits (after the Kth bit) to 0. See step 134 of FIG. 13. Next, if the first comparison signal dU11, sampled after signal PM1, is at a low level (e.g., step 135 of FIG. 13), this indicates that the polarity of the voltage difference corresponding to the feedback signal VFB is also low. The Kth bit is kept as 1 for the next cycle (e.g., step 136 of FIG. 13). Otherwise, if the first comparison signal dU11, sampled after signal PM1, is at a high level, this indicates that the polarity of the voltage difference corresponding to the feedback signal VFB is high. the Kth bit is modified to 0 for the next cycle (e.g., step 137 of FIG. 13). Then, proceed to the next bit (K+1) and repeat the above steps until the procedure is completed for the LSB (K=N) (e.g., step 138 of FIG. 13).

In some other embodiments, the voltage calibration unit U22 performs the following steps after N cycles. The specific implementation process of linearly adjusting the digital calibration code based on the feedback signal is as follows: after N cycles (e.g., step 139 of FIG. 13), if the polarity of the voltage difference corresponding to the feedback signal is negative, increase the digital correction code by 1 (e.g., step 141 of FIG. 13). If the polarity of the voltage difference corresponding to the feedback signal is positive, decrease the digital correction code by 1 (e.g., step 142 of FIG. 13).

In particular, after completing the algorithm for the first N cycles, the residual current IL1 flowing through the inductor L1 is already very close to zero when turning off the second power switch Q2. To enable real-time detection and ensure that the residual current IL1 flowing through the inductor L1 is even closer to zero, the first voltage V1 can be linearly adjusted. Specifically, if the first comparison signal dU11, sampled by the signal PM1, is at a low level, this indicates that the polarity of the feedback signal VFB corresponds to a low voltage difference. Then in the next cycle, the digital correction code AD1 is increased by 1. Conversely, if the first comparison signal dU11, sampled by the signal PM1, is at a high level, this indicates that the polarity of the feedback signal VFB corresponds to a high voltage difference. Then in the next cycle, the digital correction code AD1 is decreased by 1. Consequently, the final digital correction code stabilizes between two codes differing by 1. As a result, the residual current IL1 flowing through the inductor L1 oscillates back and forth between slightly greater than zero and slightly less than zero. Thus, the control signal tri transitions from a low level to a high level, allowing the power conversion circuit to operate in a high-impedance state, and the voltage at the common node P1 stabilizes quickly to match the voltage on the output voltage bus Vout. This minimizes power losses from the body diodes of the first power switch Q1 and the second power switch Q2.

In one embodiment, after the voltage calibration unit U22 has completed the step of linearly adjusting the digital correction code based on feedback signals for N cycles, the voltage calibration unit U22 is further used to perform the following method steps: after N cycles, calculate the difference between the digital correction code for the A-th cycle and the digital correction code for the (A−B)-th cycle, where A>B≥1. If the difference is greater than or equal to A−1, then reset by configuring MSB of the digital correction code to 1 and all other bits to 0 and restart the initial voltage calibration process.

In some embodiments, A is equal to 5 and B is equal to 1. The difference between the digital correction code for the first cycle and the digital correction code for the fourth cycle is calculated. If this difference is greater than or equal to 4, it indicates that an adjustment is required in each cycle (e.g., step 143 of FIG. 13). In such a case, it is possible that the operating conditions of the power conversion circuit have changed, leading to a relatively large error in the residual current flowing through the inductor L1. Therefore, it is necessary to return to the beginning of the algorithm (i.e., return to the step of configuring MSB of the digital correction code to 1) to retrace and find the correct digital correction code. The number of cycles and the threshold for the correction code difference can be set according to the specific application requirements. The embodiments of the present application do not impose specific restrictions on these parameters. For example, in an embodiment, the threshold for the correction code difference is set to A−1.

It should be noted that the method steps performed by the voltage calibration unit U22 in the above-mentioned embodiments can be applied to any embodiment of the present application and will not be reiterated in the following description.

Figure 7:
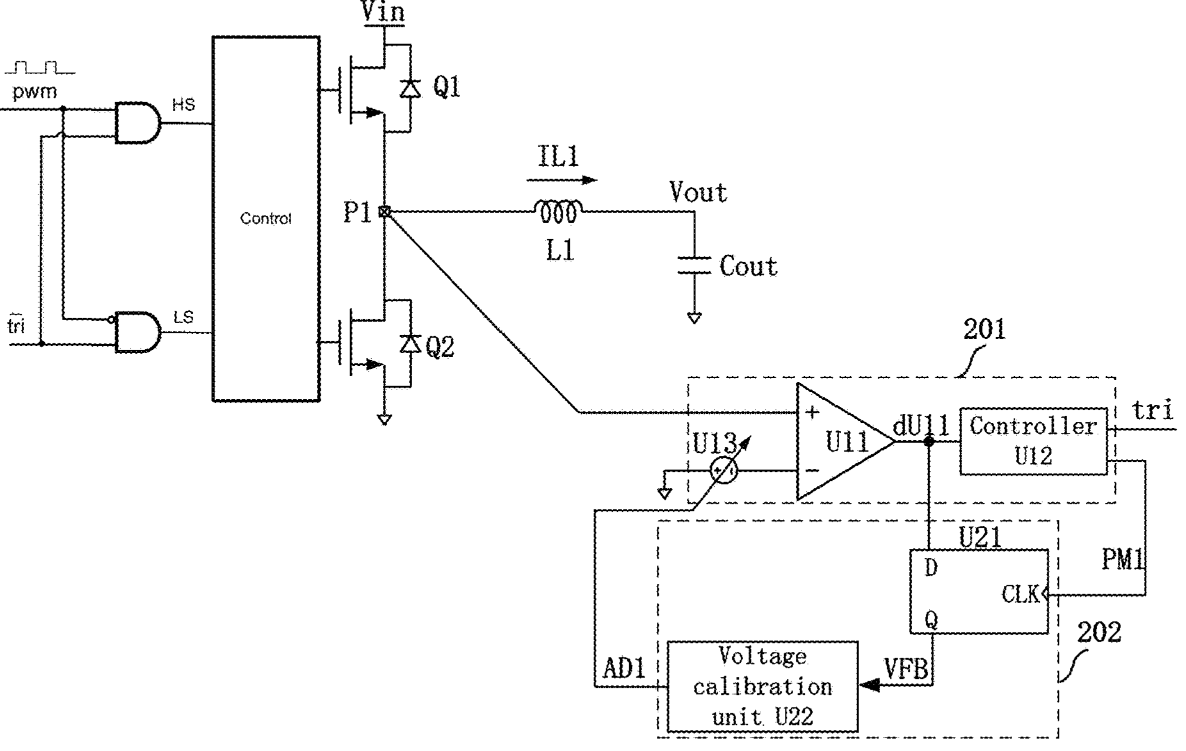
FIG. 7 is a second schematic diagram of another circuit structure corresponding to the structure shown in FIG. 3.

FIG. 7 provides an illustrative example of a second circuit structure corresponding to the structure shown in FIG. 3.

The difference between the circuit structure shown in FIG. 7 and the circuit structure shown in FIG. 4 is as follows: In FIG. 4, the adjustable voltage source U13 is connected between the common node P1 and the non-inverting input of the first comparator U1. In FIG. 7, the adjustable voltage source U13 is connected between the inverting input of the first comparator U11 and ground. In this case, in FIG. 7, the first input of the first comparator U11 receives the voltage of the common node P1, and the second input of the first comparator U11 receives the first voltage V1. It should be understood that the specific implementation process of the circuit structure shown in FIG. 7 is similar to that of FIG. 4, and within the comprehension of those skilled in the art. Therefore, further elaboration is not necessary.

Figure 8:
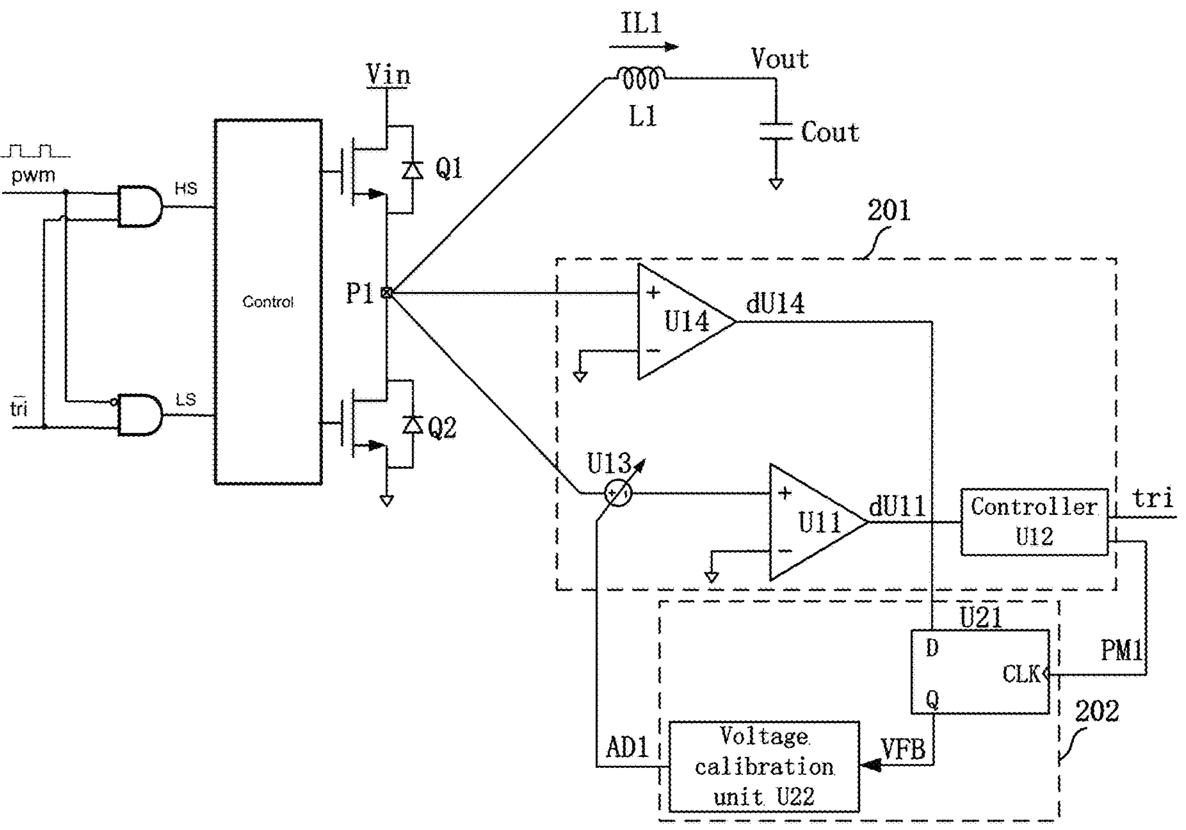
FIG. 8 is a third schematic diagram of yet another circuit structure corresponding to the structure shown in FIG. 3.

FIG. 8 provides an illustrative representation of a third circuit structure corresponding to the structure shown in FIG. 3. In one embodiment, as shown in FIG. 8, the comparison branch 201 includes the first comparator U11, the second comparator U14, and the controller U12.

The controller U12 is connected between the first comparator U11 and the feedback branch 202. The second comparator U14 is connected between the common node P1 and the feedback branch 202. Specifically, the first input terminal of the second comparator U14 is connected to the common node P1. The second input terminal of the second comparator U14 is grounded. The output terminal of the second comparator U14 is connected to the feedback branch 202. The output terminal of the first comparator U11 is connected to the controller U12. The controller U12 is connected to the feedback branch 202. The first input terminal of the first comparator U11 receives the voltage difference between the common node P1 and the first voltage V1. The second input terminal of the first comparator U11 is grounded.

In this embodiment, the first comparator U11 is used to generate the first comparison signal dU11 based on the polarity of the voltage difference and outputs it to the controller U12. The controller U12 is responsible for producing a control signal tri when there is a level transition in the first comparison signal dU11 and maintaining it. It also generates a pulse with a delay of the first duration and outputs it to the feedback branch 202. The second comparator U14 generates the second comparison signal dU14 based on the polarity of the voltage at the common node P1 and outputs it to the feedback branch. The feedback branch 202 is further responsible for sampling the second comparison signal dU14 based on the pulses and generating the feedback signal VFB. It is also used to adjust the first voltage V1 based on the feedback signal VFB.

Additionally, in this embodiment, the comparison branch 201 also includes an adjustable voltage source U13. Similarly, the feedback branch 202 also includes a D flip-flop U21 and a voltage calibration unit U22. It differs from the circuit shown in FIG. 5 in which the D flip-flop U21 is connected between the second comparator U14 and the voltage calibration unit U22. Specifically, the signal input of the D flip-flop U21 is connected to the output of the second comparator U14, receiving the second comparison signal dU14 as input. The D flip-flop U21 is used to sample the second comparison signal dU14 upon receiving the pulse PM1, generate the feedback signal VFB, and feed the feedback signal VFB into the voltage calibration unit U22.

The operating principles of the circuit structure shown in FIG. 8 will be explained in the following with reference to FIG. 9.

Figure 9:
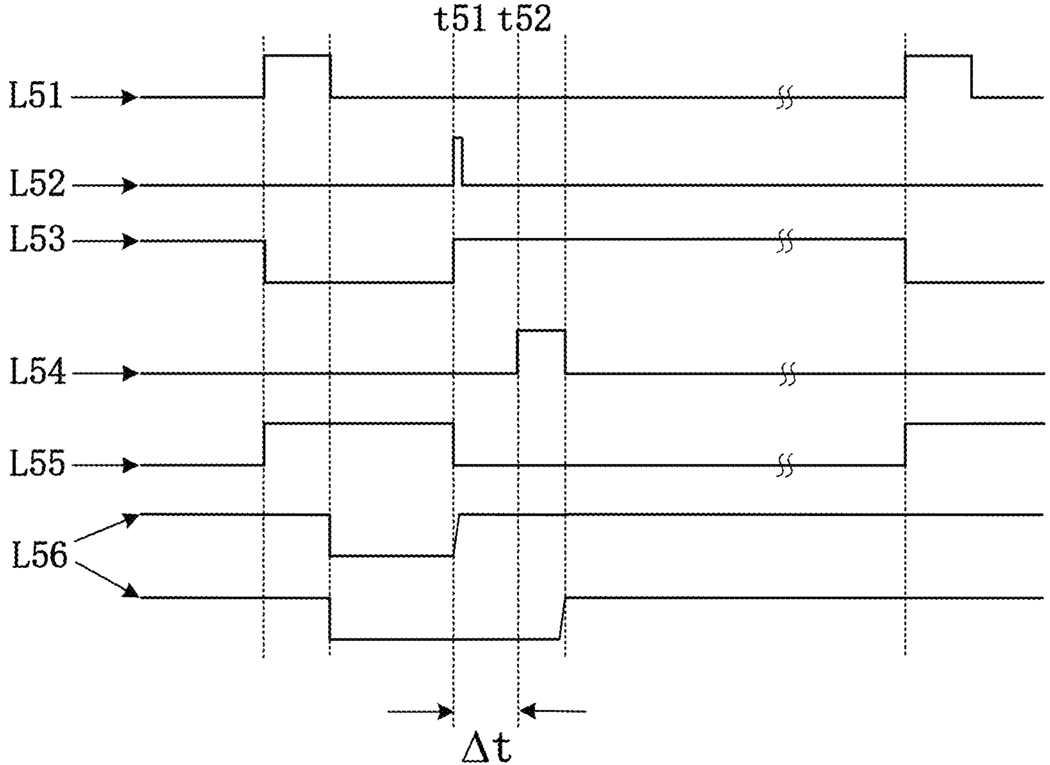
FIG. 9 is a waveform diagram of various signals in the circuit structure shown in FIG. 8.

FIG. 9 shows a waveform of various signals in the circuit as depicted in FIG. 8. As illustrated in FIG. 9, Curve L51 represents the PWM signals that control the first power switch Q1 and the second power switch Q2. Curve L52 represents the first comparison signal, dU11, output by the first comparator U11. Curve L53 represents the control signal tri output by the controller U12. Curve L54 represents a signal, PM1, output by the controller U12 after generating the control signal tri and delaying it by the first duration Δt. Curve L55 represents the enable signal of the first comparator U11. Curve L56 illustrates two possible waveforms for the second comparison signal, dU14, which is the output of the second comparator U14.

Specifically, after each instance of the first comparison signal dU11 transitioning from a low level to a high level, the controller U12 will configure the control signal tri to transition from a low level to a high level. Simultaneously, starting the generation of signal PM1. The rising edge of the signal PM1 is delayed by the first duration Δt (as shown in FIG. 9) compared to the rising edge of the control signal tri (where the time between moments t51 and t52 represents the first duration Δt). At the rising edge of the PM1 signal, the output state of the second comparator U14 is sampled using D flip-flop U21. If at this moment, the second comparison signal dU14, sampled by the PM1 signal, is low, it indicates that when the second power switch Q2 is turned off, the residual current IL1 on inductor L1 is greater than zero. Therefore, in the next cycle, the calibration signal AD1 should be increased to raise the input equivalent offset voltage of the first comparator U11 (achieved by increasing the first voltage V1 from adjustable voltage source U13). This results in the need for a slightly higher voltage on common node P1 to switch the second comparison signal dU14 from low to high. Consequently, when the second comparison signal dU14 transitions from low to high, the residual current IL1 flowing through the inductor L1 is somewhat smaller than that in the previous cycle and closer to zero.

On the other hand, if the second comparison signal dU14, sampled by the PM1 signal, is high, it indicates that when the second power switch Q2 is turned off, the residual current IL1 flowing through the inductor L1 is less than zero. Therefore, in the next cycle, the calibration signal AD1 should be reduced to decrease the input equivalent offset voltage of the comparator. This results in the common node P1 needing a slightly lower voltage to trigger a transition of the output of the second comparison signal dU14 from low to high. Correspondingly, when the second comparison signal dU14 transitions from low to high, the residual current IL1 flowing through the inductor L1 is somewhat less negative than that in the previous cycle and closer to zero.

At the end, the calibration signal AD1 will stabilize between two codes differing by one, and the corresponding residual current IL1 flowing through the inductor L1 will oscillate back and forth between slightly above and slightly below zero. Consequently, the transition of control signal tri from low to high, enabling the power conversion circuit to operate in a high impedance state, allows the voltage at the common node P1 to quickly stabilize to a voltage level equal to the voltage on the output voltage bus Vout. This minimizes power losses from the body diodes of the first power switch Q1 and the second power switch Q2.

Furthermore, in this embodiment, there is no need to extend the duration of the enable signal of the first comparator U11 when it is in a high state. It should only remain high during the conduction time of the first power switch Q1 or the second power switch Q2.

Figure 10:
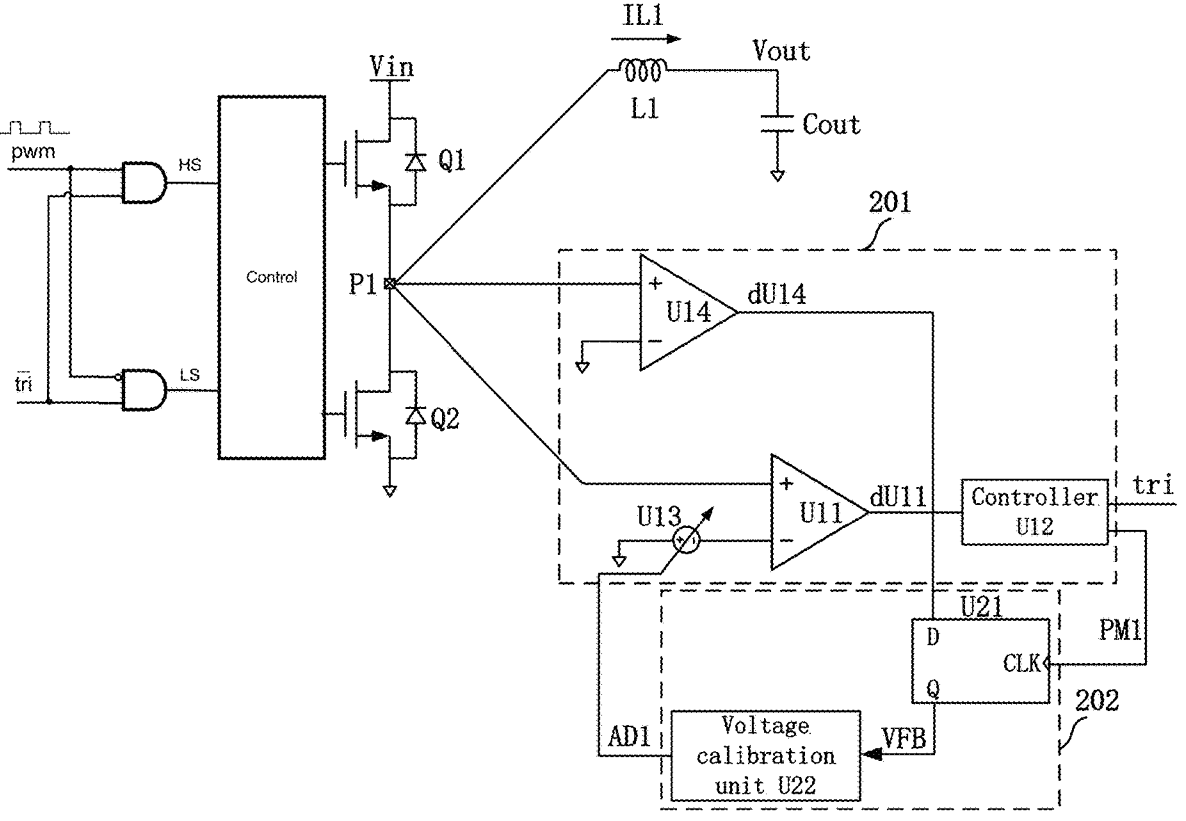
FIG. 10 is a fourth schematic diagram of another circuit structure corresponding to the structure shown in FIG. 3.

FIG. 10 provides an illustrative representation of the fourth circuit structure corresponding to the structure shown in FIG. 3. The circuit structure shown in FIG. 10, as presented, differs from the circuit structure depicted in FIG. 8 in the following way: the circuit structure in FIG. 8 connects the adjustable voltage source U13 between the common node P1 and the non-inverting input of the first comparator U1. On the other hand, the circuit structure in FIG. 10 connects the adjustable voltage source U13 between the inverting input of the first comparator U11 and ground. In FIG. 10, the first input of the first comparator U11 is fed with the voltage on the common node P1, and the second input of the first comparator U11 is supplied with the first voltage V1. It is understood that the specific implementation process of the circuit structure shown in FIG. 10 is similar to that of FIG. 8, and therefore will not be reiterated herein.

FIG. 11 illustrates a flowchart of the switch control method provided in the present application's embodiment. This switch control method is applied to a power conversion circuit. The power conversion circuit comprises a first power switch Q1, a second power switch Q2, and an inductor L1. The first power switch Q1 and the second power switch Q2 are connected in series between the input voltage bus Vin and ground. The inductor L1 is connected between the common node P1 of the first power switch Q1 and the second power switch Q2, and the output voltage bus Vout. Detailed explanations regarding the power conversion circuit can be found in the descriptions related to FIGS. 1 and 2 in the previous embodiment. Therefore, further details are not reiterated herein.

As shown in FIG. 11, the switch control method comprises the following method steps:

Step 111: controlling the turn-off of the second power switch based on the polarity of the voltage difference between the voltage at the common node and the first voltage.

Step 112: delaying a first duration after each time the second power switch is controlled to turn off, and after the first duration has elapsed, adjusting the first voltage based on the polarity of the first signal. The first signal is the voltage difference or the voltage at the common node. If the voltage polarity is positive, then decreasing the first voltage to control the second power switch to turn off earlier. If the voltage polarity is negative, then increasing the first voltage to control the second power switch to turn off later.

Specifically, assuming that in the current cycle, the second power switch Q2 is controlled to turn off, and then after the first duration delay, it is determined that the polarity of the voltage difference between the common node P1 and the first voltage V1 is negative. This can confirm that when the second power switch Q2 is turned off, the residual current IL1 flowing through the inductor L1 is greater than zero (assuming that current flowing from the common node P1 to the output voltage bus Vout is considered positive). Consequently, it can be determined that the second power switch Q2 is turning off too early. In this case, it is necessary to increase the control signal for the first voltage V1 in order to delay the turn-off of the second power switch Q2 in the next cycle.

Assuming that in the current cycle, the second power switch Q2 is controlled to turn off, and then after delaying the first duration, the feedback circuit 202 determines that the polarity of the voltage difference is positive. This can confirm that when the second power switch Q2 is turned off, the residual current in the inductor is less than zero, indicating that the second power switch Q2 is turning off too late. In this case, it is necessary to decrease the control signal for the first voltage V1 in order to advance the turn-off of the second power switch Q2 in the next cycle.

Through the continuous adjustment process as described above, it is ultimately possible to control the turn-off of the second power switch Q2 near the moment when the current IL1 flowing through the inductor L1 crosses zero. This is advantageous for improving the power conversion efficiency of the power conversion circuit.

In one embodiment, the specific implementation process of controlling the turn-off of the second power switch in step 111, based on the polarity of the voltage difference between the common node and the first voltage, is as follows: the second power switch is controlled to turn off when the polarity of the voltage difference changes.

Figure 12:
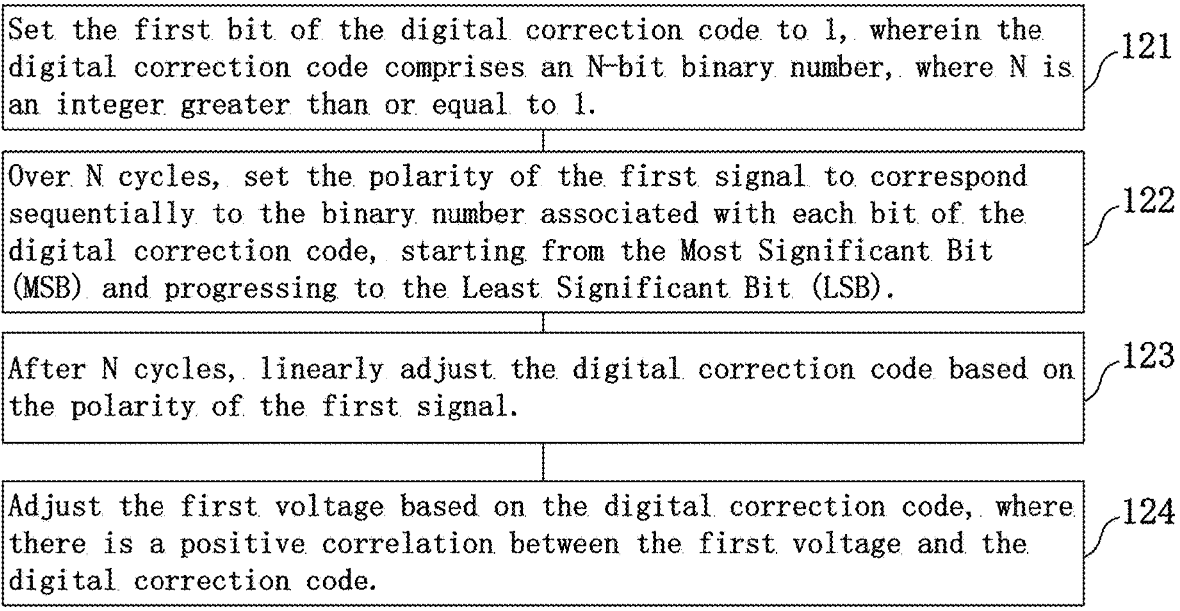
FIG. 12 is a flow chart of one implementation of step 112 as shown in FIG. 11.

In one embodiment, as shown in FIG. 12, the specific implementation process of adjusting the first voltage based on the polarity of the first signal in step 112 can include the following steps:

Step 121: setting the MSB of a digital correction code to 1, where the digital correction code consists of an N-bit binary number, and N is an integer greater than or equal to 1.

Step 122: over N cycles, based on the polarity of the first signal, sequentially set the binary value corresponding to each bit of the digital correction code from the MSB to the LSB.

Step 123: after N cycles, linearly adjust the digital correction code based on the polarity of the first signal.

Step 124: adjust the first voltage based on the digital correction code, where the first voltage is positively correlated with the digital correction code.

In one embodiment, the specific process of setting each bit of the digital correction code from the MSB to the LSB based on the polarity of the first signal in N periods in Step 122 can include the following steps: 1. In the N periods, during the K-th period, set the K-th bit of the digital correction code to 1, and set all the bits after the K-th bit to 0. 2. If the polarity of the first signal is negative, maintain the K-th bit as 1 after the K-th period. 3. If the polarity of the first signal is positive, set the K-th bit to 0 after the K-th period. 4. Repeat this process for K increasing from 1 to N.

In one embodiment, the specific process of linearly adjusting the digital correction code based on the polarity of the first signal after N periods in Step 123 can include the following steps: 1. after N periods, if the polarity of the first signal is negative, increment the digital correction code by 1. 2. after N periods, if the polarity of the first signal is positive, decrement the digital correction code by 1.

In one embodiment, the switch control method further includes the following steps:

after N periods, calculate the difference between the digital correction code of the A-th period and the digital correction code of the (A−B)-th period, where A>B≥1. If the difference is greater than or equal to A−1, then return to executing the configuration of the digital correction code with MSB set to 1 and other bits set to 0, and restart the calibration process. It should be understood that the specific control of the power conversion circuit and the beneficial effects achieved in the method embodiments can be referred to in the descriptions of the corresponding embodiments of the switch control circuit mentioned above. To keep it concise, further details will not be reiterated here.

In this application, embodiments of the power conversion system are also provided. The power conversion system comprises a power conversion circuit and the switch control circuit 200 of any of the embodiments of this application. The power conversion circuit comprises a first power switch Q1, a second power switch Q2, and an inductor L1

The first power switch Q1 and the second power switch Q2 are connected in series between the input voltage bus Vin and ground. The inductor L1 is connected between the common node P1 of the first power switch Q1 and the second power switch Q2 and the output voltage bus Vout. The detailed explanations regarding the power conversion circuit have been discussed above with respect to FIGS. 1 and 2. These details will not be reiterated here.

The switch control circuit 200 is connected to the common node P1 and is responsible for controlling the turning off of the second power switch Q2.

It should be noted that the above embodiments are provided to illustrate the technical solution of the present application, not to limit it. Under the concept of the present application, the technical features in the above embodiments or different embodiments can be combined, steps can be implemented in any order, and there are many other variations within the scope of the present application as described above, which are not detailed here for the sake of brevity. Although the present application has been described in detail with reference to the above embodiments, those skilled in the art should understand that the technical solutions described in the above embodiments can still be modified or certain technical features can be equivalently replaced. Such modifications or replacements do not depart from the essence of the technical solutions of the various embodiments of the present application Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A switch control circuit applied to a power conversion circuit, wherein the power conversion circuit comprises a first power switch, a second power switch, and an inductor, and wherein the first power switch and the second power switch are connected between an input voltage bus and ground, and the inductor is connected between a common node of the first power switch and the second power switch and an output voltage bus, and wherein the switch control circuit comprises a comparison branch and a feedback branch, and wherein the comparison branch is connected to the feedback branch, and wherein:

the comparison branch is used to receive a voltage on the common node of the first power switch and the second power switch, and based on a polarity of a voltage difference between the voltage on the common node and a first voltage, output a control signal for turning off the second power switch; and the feedback branch is used to output a feedback signal based on a polarity of a first signal after the comparison branch turns off the second power switch and delays by a first time duration, and to adjust the first voltage based on the feedback signal, and wherein the first signal is the voltage difference or the voltage on the common node, and wherein if the polarity of the first signal is positive, the first voltage is decreased to turn off the second power switch prematurely, and if the polarity of the first signal is negative, the first voltage is increased to delay the turning off of the second power switch.

2. The switch control circuit according to claim 1, wherein the comparison branch comprises a first comparator and a controller, and wherein:

the controller is connected between the first comparator and the feedback branch;

the first comparator is used to output a first comparison signal fed into the controller based on the voltage difference;

the controller is used to output the control signal and hold it when there is a level transition in the first comparison signal, and then the controller outputs a pulse fed into the feedback branch after a delay of the first time duration;

the feedback branch is also used to sample the first comparison signal based on the pulse and generate the feedback signal, and to adjust the first voltage based on the feedback signal.

3. The switch control circuit according to claim 2, wherein:

the output terminal of the first comparator is connected to the controller, and the controller is connected to the feedback branch; and the first input terminal of the first comparator receives the voltage difference, and the second input terminal of the first comparator is grounded.

4. The switch control circuit according to claim 2, wherein:

when the comparison branch comprises the first comparator, the second comparator, and the controller, the first input terminal of the second comparator is connected to the common node, the second input terminal of the second comparator is grounded, the output terminal of the second comparator is connected to the feedback branch, the output terminal of the first comparator is connected to the controller, and the controller is connected to the feedback branch; and the first input terminal of the first comparator receives the voltage difference, and the second input terminal of the first comparator is grounded, or the first input terminal of the first comparator receives the voltage of the common node, and the second input terminal of the first comparator receives the first voltage.

5. The switch control circuit according to claim 2, wherein:

the feedback branch comprises a D flip-flop and a voltage calibration unit, and the D flip-flop is connected to the controller;

the voltage calibration unit is used to adjust the first voltage based on the feedback signal;

the D flip-flop is connected between the first comparator and the voltage calibration unit;

the D flip-flop is used to sample the first comparison signal upon receiving the pulse to generate the feedback signal and feed the feedback signal to the voltage calibration unit.

6. The switch control circuit according to claim 5, wherein:

the clock input of the D flip-flop is connected to the controller to receive the pulse signal, and the output of the D flip-flop is connected to the voltage calibration unit to output the feedback signal to the voltage calibration unit; and the signal input of the D flip-flop is connected to the output of the first comparator to receive the first comparison signal.

7. The switch control circuit according to claim 5, wherein the voltage calibration unit is further used for:

configuring MSB of a digital correction code as 1, and wherein the digital correction code comprises an N-bit binary number, with N being an integer greater than or equal to 1;

over N periods, based on the feedback signal, sequentially setting each bit of the digital correction code from the MSB to the LSB, and wherein each pulse corresponds to one period;

after the N periods, linearly adjusting the digital correction code based on the feedback signal; and adjusting the first voltage based on the digital correction code, and wherein the first voltage shows a positive correlation with the digital correction code.

8. The switch control circuit according to claim 7, wherein the voltage calibration unit is further used for:

over the N periods, when setting the K-th bit of the digital correction code in the K-th period, setting the K-th bit of the digital correction code to 1 and setting the bits following the K-th bit to 0, and wherein:

if the polarity of the voltage difference corresponding to the feedback signal is negative, the K-th bit is kept as 1 after the K-th period; and if the polarity of the voltage difference corresponding to the feedback signal is positive, the K-th bit is set to 0 after the K-th period, and wherein K sequentially increases from 1 to N, K being 1 corresponds to the MSB, and K being N corresponds to the LSB.

9. The switch control circuit according to claim 7, wherein the voltage calibration unit is further used for:

after the N periods, if the polarity of the voltage difference corresponding to the feedback signal is negative, increasing the digital correction code by 1; and after the N periods, if the polarity of the voltage difference corresponding to the feedback signal is positive, decreasing the digital correction code by 1.

10. The switch control circuit according to claim 7, wherein the voltage calibration unit is further used for:

after the N periods, calculating the difference between the digital correction code in the A-th period and the digital correction code in the (A−B)-th period, and wherein A>B≥1, and wherein:

if the difference is greater than or equal to A−1, revert to configuring MSB of the digital correction code as 1.

11. The switch control circuit according to claim 2, wherein the comparison circuit further includes an adjustable voltage source, and wherein:

the adjustable voltage source is connected between the common node and the first comparator; and the adjustable voltage source is used to output the first voltage.

12. A switch control method, applicable to a power conversion circuit, wherein the power conversion circuit comprises a first power switch, a second power switch, and an inductor, and wherein the first power switch and the second power switch are connected between an input voltage bus and ground, and the inductor is connected between a common node of the first power switch and the second power switch, and an output voltage bus, and wherein the switch control method comprises the following steps:

controlling the second power switch to turn off based on a polarity of a voltage difference between a voltage on the common node and a first voltage; and introducing a delay of a first duration every time when the second power switch is controlled to turn off, and, after the first duration has elapsed, adjusting the first voltage based on a polarity of a first signal, and wherein the first signal is either the voltage difference or the voltage on the common node, and wherein if the voltage polarity is positive, the first voltage is reduced to control the second power switch to turn off earlier, and if the voltage polarity is negative, the first voltage is increased to control the second power switch to turn off later.

13. The switch control method according to claim 12, wherein controlling the second power switch to turn off based on the polarity of the voltage difference between the voltage at the common node and the first voltage includes:

controlling the second power switch to turn off when the polarity of the voltage difference changes.

14. The switch control method according to claim 12, wherein adjusting the first voltage based on the polarity of the first signal includes:

configuring MSB of a digital correction code as 1, and wherein the digital correction code comprises an N-bit binary number, and N is an integer greater than or equal to 1;

within N periods, sequentially setting the binary values corresponding to each bit of the digital correction code based on the polarity of the first signal from the MSB to the LSB, after the N periods, linearly adjusting the digital correction code based on the polarity of the first signal; and adjusting the first voltage based on the digital correction code, and wherein the first voltage is positively correlated with the digital correction code.

15. The switch control method according to claim 14, wherein the process of sequentially setting the binary values corresponding to each bit of the digital correction code based on the polarity of the first signal within N periods includes:

within N periods, when setting the Kth bit of the digital correction code in the Kth period, setting the Kth bit of the digital correction code to 1 and setting the bits after the Kth bit to 0, and wherein:

if the polarity of the first signal is negative, the Kth bit is kept as 1 after the Kth period; and if the polarity of the first signal is positive, the Kth bit is set to 0 after the Kth period, and wherein K increases sequentially from 1 to N.

16. The switch control method according to claim 14, wherein linearly adjusting the digital correction code based on the polarity of the first signal after the N periods includes:

after the N periods, if the polarity of the first signal is negative, incrementing the digital correction code by 1; and after the N periods, if the polarity of the first signal is positive, decrementing the digital correction code by 1.

17. The switch control method according to claim 14, further comprising:

after the N periods, calculating a difference between the digital correction code of the A-th period and the digital correction code of the A-B-th period, where A>B≥1, and wherein if the calculated difference is greater than or equal to A−1, MSB of the configured digital correction code is set to 1.

18. A power conversion system comprising:

a first power switch and a second power switch connected between an input voltage bus and ground;

an inductor connected between a common node of the first power switch and the second power switch, and an output voltage bus;

an output capacitor connected between the output voltage bus and ground; and a switch control circuit comprising a comparison branch and a feedback branch connected to the comparison branch, wherein:

the comparison branch is configured to receive a voltage on the common node of the first power switch and the second power switch, and based on a polarity of a voltage difference between the voltage on the common node and a first voltage, the comparison branch is configured to generate a control signal for turning off the second power switch; and the feedback branch is configured to generate a feedback signal based on a polarity of a first signal after the comparison branch turns off the second power switch and delays by a first time duration, and the feedback branch is configured to adjust the first voltage based on the feedback signal, and wherein:

the first signal is the voltage difference between the voltage on the common node and the first voltage or the voltage on the common node, and wherein:

if the polarity of the first signal is positive, the first voltage is decreased to turn off the second power switch prematurely; and if the polarity of the first signal is negative, the first voltage is increased to delay the turning off of the second power switch.

19. The power conversion system according to claim 18, wherein:

the comparison branch comprises a first comparator and a controller, and wherein:

the controller is connected between the first comparator and the feedback branch;

the first comparator is used to output a first comparison signal fed into the controller based on the voltage difference;

the controller is used to output the control signal and hold it when there is a level transition in the first comparison signal, and then the controller outputs a pulse fed into the feedback branch after a delay of the first time duration;

the feedback branch is also used to sample the first comparison signal based on the pulse and generate the feedback signal, and to adjust the first voltage based on the feedback signal;

the feedback branch comprises a D flip-flop and a voltage calibration unit, and the D flip-flop is connected to the controller;

the voltage calibration unit is used to adjust the first voltage based on the feedback signal;

the D flip-flop is connected between the first comparator and the voltage calibration unit; and the D flip-flop is used to sample the first comparison signal upon receiving the pulse to generate the feedback signal and feed the feedback signal to the voltage calibration unit.

* * * * *